Sept. 27, 1949.    J. A. STAHN    2,482,806
LUBRICATION SYSTEM
Filed Jan. 5, 1948
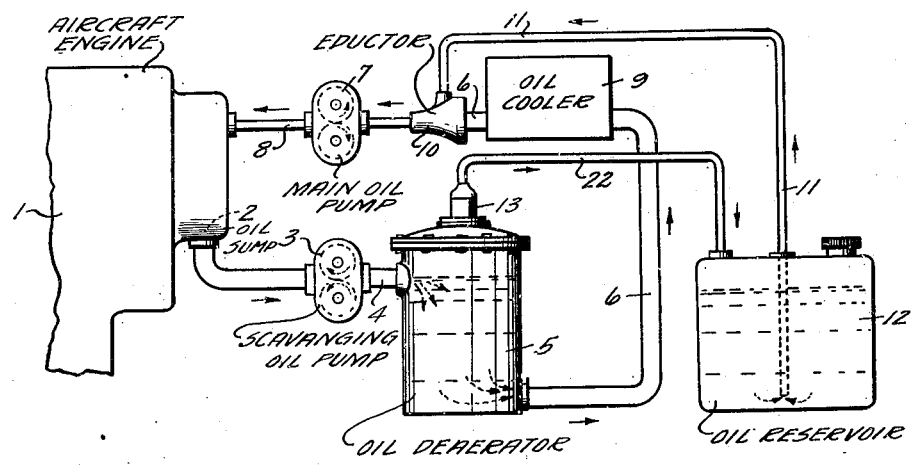
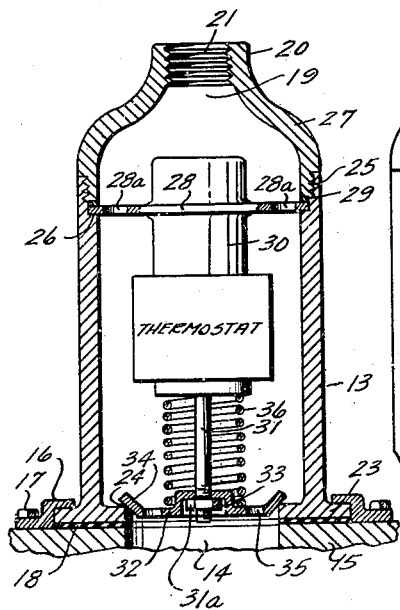 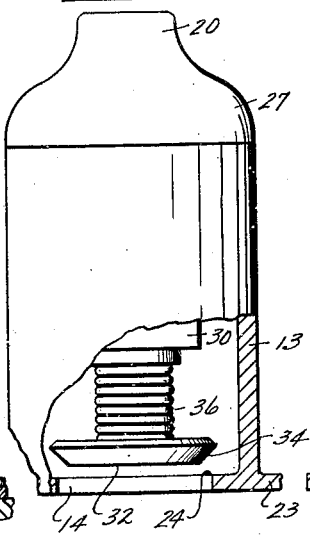 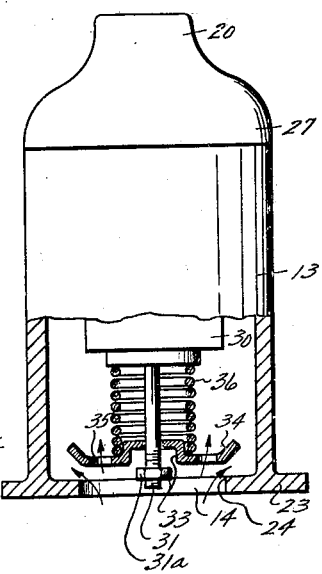
INVENTOR.
JAMES A. STAHN Patented Sept. 27, 1949

2,482,806

UNITED STATES PATENT OFFICE 2,482,806

LUBRICATION SYSTEM

James A. Stahn, Racine, Wis.

Application January 5, 1948, Serial No. 477

2 Claims. (Cl. 184—6)

(Granted under the act of March 3, 1883, as amended April 30, 1928; 370 O. G. 757)

The invention described herein may be manufactured and used by or for the Government for governmental purposes without payment to me of any royalty thereon.

This invention relates to improvements in de-aerator valves and more particularly to de-aerator vent valves for use in high altitude aircraft lubricating systems, and has for an object the provision of de-aerator valve means for normally providing a restricted vent means for a de-aerating chamber having thermostatically responsive relief valve means for increasing the area of the vent means incident to a predetermined decrease in temperature of the fluid being vented.

A further object is the provision of improved de-aerating valve means having a predetermined metered flow therethrough and yieldable pressure responsive means for providing an increase flow around the metering valve means at low temperatures, to prevent stoppage of the metered flow by the congealment of the fluid in the metering openings at low temperatures.

A further object is the provision of de-aerating valve means having a valve seat and spring loaded low temperature responsive venting valve means formed with a predetermined venting area for passing a de-aerated fluid therethrough, in which the temperature responsive means displaces the venting valve from its seat when the temperature of the fluid passing said valve is below a predetermined low temperature, to thereby increase the venting area.

A still further object is the provision of improved de-aerating valve venting means having spring loaded and temperature responsive venting valve means for offering a predetermined yieldable resistance to flow of the fluid to be aerated therethrough at normal temperatures and viscosity and providing a predetermined increased flow at low temperatures when the viscosity of the fluid is greater.

A further object is the provision of a fluid circulation system having a de-aerating pressure relief valve device including a vented fluid metering valve member for controlling and predetermining the passage of the de-aerated fluid therethrough in a predetermined ratio to the temperature, viscosity, and pressure of the fluid being circulated.

A further object is the provision of a de-aerator having a vented displaceable metering valve which provides a large area for the flow of de-aerated air and oil therethrough when the engine is started, to decongeal any cold oil in the metering holes of the displaceable metering valve that would have a tendency to clog with congealed oil at low temperatures, including thermostatic means for unseating the valve at low temperatures to permit the free flow and seating the venting valve as the air and oil vapors become hotter due to an increase in the oil temperature, to thereby reduce or eliminate the free flow of the de-aerated fluid except the fluid flowing through the metering holes in the valve means.

A further object includes the provision of yieldable seating means for yieldably holding the meter valve means on its seat so that in the event of clogging of the metering valve means the metering valve means yields to permit air and oil vapors to flow around the metering valve means to heat the same and clear the metering valve apertures.

Other objects and advantages of my invention will become apparent from the following description, taken in connection with the accompanying drawings, in which like reference characters refer to like parts in the several figures.

Fig. 1 is a diagrammatic view of a closed lubricating system for an internal combustion engine, incorporating my improved de-aerating valve means.

Fig. 2 is an enlarged longitudinal sectional view taken through my improved valve means showing the same in normal or closed position.

Fig. 3 is a side elevation of my de-aerator valve with the lower portion thereof broken away and shown in section. The valve being illustrated in retracted position from its valve seat by the cold temperature responsive device, illustrating the position of the valve when the oil is cold.

Fig. 4 is a view similar to Fig. 3, also showing the valve in its bypassing position, illustrating the position of the valve when the oil viscosity is heavy or when the vent openings are clogged.

Referring more particularly to Fig. 1, a closed lubricating or oil circulation system for an internal combustion engine is illustrated, somewhat analogous to the closed oil lubricating system illustrated in Fig. 1 of United States Patent 2,024,336 to G. S. Cavanaugh, patented December 17, 1935, the reference numeral 1 designating an internal combustion engine preferably of the dry sump type, such as an aircraft engine. Lubricating oil after being circulated through the engine in the usual manner is withdrawn from the sump 2 by a scavenging oil pump 3 and delivered through a conduit 4 to a conventional de-aerating device or chamber 5. The oil after passing through suitable de-aerating baffles or other similar flow retarding means within the de-aerating chamber 5 is withdrawn from the lower portion of the de-aerating chamber through a conduit 6 by the main engine pressure pump 7 and is again delivered to the engine under pressure through a conduit 8, and is distributed to the engine bearings in the conventional manner. An oil cooler 9 of conventional construction is interposed in the conduit 6 for cooling and controlling the temperature of the oil that is returned to the engine through conduits 6 and 8.

An eductor nozzle 10, also of conventional construction, is interposed in the oil return conduit 6 between the oil cooler 9 and the main engine pressure pump 7 and is provided with an oil supply line 11 leading from the lower portion of a main oil reservoir 12. The eductor 10, through its connected supply line 11, supplies fresh oil from the reservoir 12 to the conduit 6 to replace oil that is used up during the operation of the engine 1.

My improved de-aerator valve device is indicated at 13 and is mounted over the port 14 (Fig. 2) formed in the top 15 of the casing of the de-aerator device 5, and is securely retained in position over the opening 14 by any conventional fastening means, such as a retaining ring 16 secured in place by screw fasteners 17 and sealed with a gasket 18. The top portion of my de-aerator valve casing 13 is formed with a reduced tubular venting extension 20 having a tapped bore 21 extending therethrough. A venting conduit 22 is threadably received in the bore 21 with its opposite end secured in communication with the interior of the mail oil reservoir 12, above the liquid level therein.

Referring particularly to Figs. 2 to 4 the de-aerator valve casing 13 is preferably a two-part cylindrical casing, having a base flange 23 and an inwardly extending valve seat 24. The lower section of the casing 13 is formed with a counter-bored end 25 forming an annular stop shoulder 26, and is threaded to receive the top closure portion 27 having the central vent opening 21 therethrough. The periphery of the closure or cap 27 is also threaded to be received by the threads in the counter-bored portion 25 of the casing.

A supporting plate 28 is secured in the counter-bored portion, and is seated against the annular shoulder 26 by the lower edge of the cap 24 when the same is securely screwed in place. An annular sealing gasket 29 is provided, preferably between the cap 27 and the plate 28, retaining the plate on its seat 26. Carried by the plate 28, axially within the casing 13, is a "cold" temperature responsive valve actuator 30, having an actuating stem 31 which extends axially within the casing and projects concentrically through the annular opening in the end of the casing that forms the valve of seat 24.

The thermostatic device 30 may be a conventional type of gas-filled bellows of the "Sylphon" type secured at one end within the casing with the valve actuating stem connected and projecting through the suitable opening in the bellows casing. The supporting plate 28 is formed with an annular ring of vent or by-pass apertures 28a to allow fluid or gas to pass through the plate 28. A perforated disk or venting valve 32 is concentrically and slidably carried on the valve stem 31, and is formed with a central cup-shaped recess 33 to receive a collar or nut 31a fixed on the stem 31. The valve disk 32 is relatively thin and light, having an annular angularly vent rim arranged for seating engagement with the valve seat 24. The valve disk 32 is formed with a plurality of small venting openings 35 therethrough, providing a predetermined venting area when the valve is seated. A coil compression spring 36 surrounds the valve stem 31 with its opposite ends engaging the lower face of the thermostatic actuator casing 13 and the upper face of the valve disk 32, normally retaining the valve disk 32 seated on its seat 24 during normal operating conditions of the engine when the oil is warm. This normal position of the valve 32 restricts, to a predetermined extent, the flow of air or gaseous fluid that has been removed from the oil by the de-aerator 5 and returned to the oil reservoir 12 through the conduit 22.

When the oil is cold its viscosity is somewhat higher and tends to cloud the small openings 35 and the disk 32. The temperature responsive device 30 withdraws the stem 31, causing the nut or collar 31a fixed thereon to engage the base of the recess 33 and lift the valve 32 off of its seat, to a position such as shown in Fig. 3. The valve remains in this position permitting circulation of a portion of the oil or fluid to pass the valve 32 and to pass the temperature responsive device 30 until the oil is sufficiently warmed by the engine to cause the temperature responsive device to lower the valve 32 to its normal operating position on its seat 24, as shown in Fig. 2. The warm oil readily clears any thick or congealed oil that was formerly present in the perforation 35 of the valve, and as the de-aeration of the warm and thinner oil takes place the de-aerated gases pass readily through the valve perforations and out through the vent pipe 22.

Should the oil become excessively viscous during use, or should the perforations 35 in the disk valve become clogged with dirt, or should the oil pressure in the de-aerator casing 5 rise beyond a predetermined degree due to retarded flow through the oil cooler, even though the temperature of the oil is above the low temperature required to open the valve by the temperature responsive device 30, the coil spring 36 will readily yield to permit the valve 32 to slide to its venting position as shown in Fig. 4 and the excessive oil pressure will be safely vented through the venting pipe 22 and passed back to the main oil reservoir 12. The tension of the coil spring 36 is predetermined however so that the valve will be maintained on its seat, if not unseated by the temperature responsive device 30 due to the low temperature of the oil, until the oil pressure between the scavenging pump 3 and the oil cooler 9 exceeds the predetermined "safe" operating pressure. When this pressure is reached the spring 36 yields and the valve 32 lifts to reduce the pressure. The velocity and temperature of the fluid or oil passing the valve 32 may then assist in clearing the perforations 35 of congealed oil and dirt.

While the drawings illustrate a simple adaptation of my invention it is obvious that minor changes may be made in the construction illustrated without departing from the spirit of the invention as defined by the appended claims. In the foregoing description, my invention has been described in conjunction with an internal combustion aircraft engine of the dry oil sump type, but it is within the scope and purview of my invention as claimed to use my improved de-aerator vent valve in conjunction with other lubricant circulation systems, such as in conjunction with a closed oil system for gas turbine engines for aircraft.

I claim:

1. In combination with a closed lubrication circulation system for aircraft internal combustion engines having a sump, a reservoir, a de-aerating chamber, pump and conduit means connected between the sump and the de-aerating chamber for pumping fluid from said sump to said de-aerating chamber, recirculation conduit means between the de-aerating chamber and the engine for returning at least a portion of the fluid received by said de-aerating chamber to said engine, a return conduit connected between the de-aerating chamber and the reservoir for returning fluid from said de-aerator to the reservoir; of a fluid metering valve means in said last-mentioned conduit having a valve seat and metering valve means normally engaging said seat, and low temperature responsive valve actuating means for unseating the said metering valve means at predetermined low temperature to by-pass the fluid in the return conduit around the metering valve means when the temperature of the fluid is below said predetermined low temperature.

2. In combination with a de-aerating system for de-aerating the lubrication system of an aircraft internal combustion engine having a sump, a reservoir, pump and conduit means connected to the sump for pumping lubricant from the sump, a de-aerating chamber connected to the pump for receiving fluid pumped thereby and de-aerating the same, a fluid conduit connected between said de-aerating chamber and the engine for returning at least a portion of the lubricant, that is pumped by the pump, to the engine for recirculation, and a fluid return conduit between the upper portion of the de-aerating chamber and the reservoir; of a de-aerating valve device interposed in said fluid return conduit comprising a casing having a metering valve seat formed therein, a perforated metering valve in said casing normally seating on said valve seat, yieldable means between said metering valve and the said casing yieldably retaining the metering valve on said seat against predetermined pressure and flow of fluid from the de-aerating chamber toward the reservoir, and predetermined low temperature responsive thermostatically operable actuator means in said casing engageable with said metering valve for unseating said metering valve at low temperature, to permit increased fluid flow through said casing and around said metering valve from said de-aerating chamber to said reservoir part when the fluid temperature is below a predetermined temperature and when the fluid pressure in the de-aerating chamber exceeds a predetermined pressure regardless of the temperature of the fluid.

JAMES A. STAHN.

REFERENCES CITED

The following references are of record in the file of this patent:

UNITED STATES PATENTS

| Number | Name | Date |
| --- | --- | --- |
| 1,927,036 | Johnson | Sept. 19, 1933 |
| 2,300,825 | Bloom | Nov. 3, 1942 |
| 2,333,993 | Frailing | Nov. 9, 1943 |
| 2,379,109 | Shaw | June 26, 1945 |
| 2,400,911 | Booth | May 28, 1946 |
| 2,421,713 | Porter | June 3, 1947 |

FOREIGN PATENTS

| Number | Country | Date |
| --- | --- | --- |
| 461,707 | Great Britain | Feb. 23, 1927 |